US009515298B2

(12) United States Patent
Saruwatari et al.

(10) Patent No.: US 9,515,298 B2
(45) Date of Patent: Dec. 6, 2016

(54) NONAQUEOUS ELECTROLYTE BATTERY AND BATTERY PACK

(71) Applicant: Kabushiki Kaisha Toshiba, Minato-ku (JP)

(72) Inventors: Hidesato Saruwatari, Kashiwazaki (JP); Hiromichi Kuriyama, Kashiwazaki (JP); Tetsuro Kano, Kashiwazaki (JP); Yuki Watanabe, Kashiwazaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/644,879

(22) Filed: Mar. 11, 2015

(65) Prior Publication Data
US 2016/0036010 A1    Feb. 4, 2016

(30) Foreign Application Priority Data

Jul. 31, 2014    (JP) .................................. 2014-156906
Mar. 4, 2015    (JP) ................................. 2015-042984

(51) Int. Cl.
*H01M 10/052*    (2010.01)
*H01M 2/02*    (2006.01)
*H01M 4/131*    (2010.01)
*H01M 4/485*    (2010.01)
(Continued)

(52) U.S. Cl.
CPC ........... *H01M 2/0202* (2013.01); *H01M 2/024* (2013.01); *H01M 4/131* (2013.01); *H01M 4/485* (2013.01); *H01M 4/505* (2013.01); *H01M 4/525* (2013.01); *H01M 10/0525* (2013.01); *H01M 2004/027* (2013.01); *H01M 2004/028* (2013.01); *Y02E 60/122* (2013.01); *Y02T 10/7011* (2013.01)

(58) Field of Classification Search
CPC .......................... H01M 4/485; H01M 10/052
See application file for complete search history.

(56) References Cited

U.S. PATENT DOCUMENTS

2005/0221170 A1    10/2005    Takeuchi et al.
2006/0068272 A1    3/2006    Takami et al.
(Continued)

FOREIGN PATENT DOCUMENTS

| EP | 1 530 248 A2 | 5/2005 |
| JP | 2005-135775 | 5/2005 |
| JP | 2011-76888 | 4/2011 |

OTHER PUBLICATIONS

Extended European Search Report issued on Dec. 10, 2015 in Patent Application No. 15158607.0.
(Continued)

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

According to one embodiment, a nonaqueous electrolyte battery includes a container, a positive electrode, and a negative electrode. The container satisfies Formula (1) of $0.15 \leq (T_{min}/T_{max}) \leq 1$. The positive electrode includes a positive electrode active material represented by the composition formula $Li_{1-a}Ni_xCo_yMn_zO_2$. The negative electrode includes a spinel type lithium titanium oxide. A nominal capacity of the nonaqueous electrolyte battery is in a range of from 5 Ah to 200 Ah. When a state of charge based on the nominal capacity is 50%, an open circuit voltage is in a range of from 2.12 V to 2.24 V.

8 Claims, 9 Drawing Sheets

(51) Int. Cl.
H01M 4/505 (2010.01)
H01M 4/525 (2010.01)
H01M 10/0525 (2010.01)
H01M 4/02 (2006.01)

(56) References Cited

U.S. PATENT DOCUMENTS

| | | | |
|---|---|---|---|
| 2008/0076030 A1* | 3/2008 | Inagaki | H01M 4/623 429/330 |
| 2010/0151301 A1* | 6/2010 | Paik | H01M 2/024 429/94 |
| 2012/0013050 A1 | 1/2012 | Yada et al. | |
| 2012/0058379 A1 | 3/2012 | Kishi et al. | |
| 2014/0045017 A1 | 2/2014 | Nonaka et al. | |
| 2016/0036026 A1 | 2/2016 | Kano et al. | |
| 2016/0036040 A1 | 2/2016 | Takami et al. | |
| 2016/0036090 A1 | 2/2016 | Sasakawa et al. | |
| 2016/0036093 A1 | 2/2016 | Hoshina et al. | |

OTHER PUBLICATIONS

Norio Takami et al. "Electrochemical Kinetics and Safety of 2-Volt Class Li-Ion Battery System Using Lithium Titanium Oxide Anode", Journal of the Electrochemical Society, 156 (2), 2009, 5 pages.

* cited by examiner

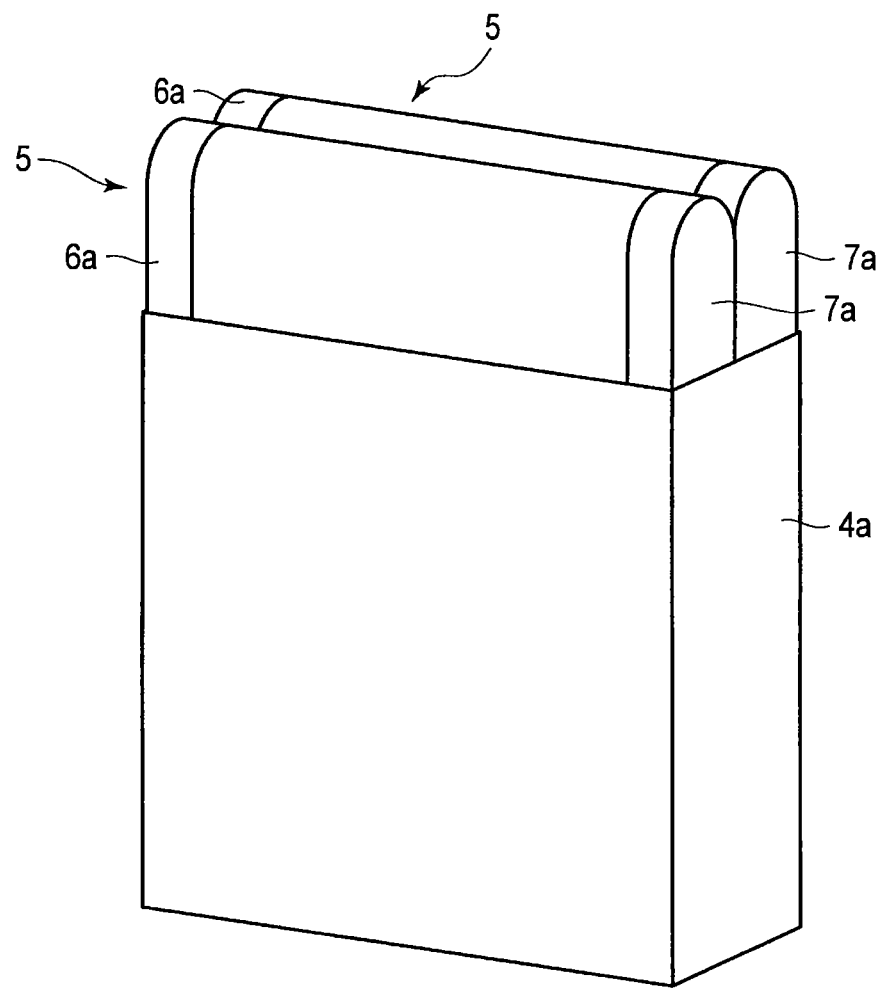
F I G. 5

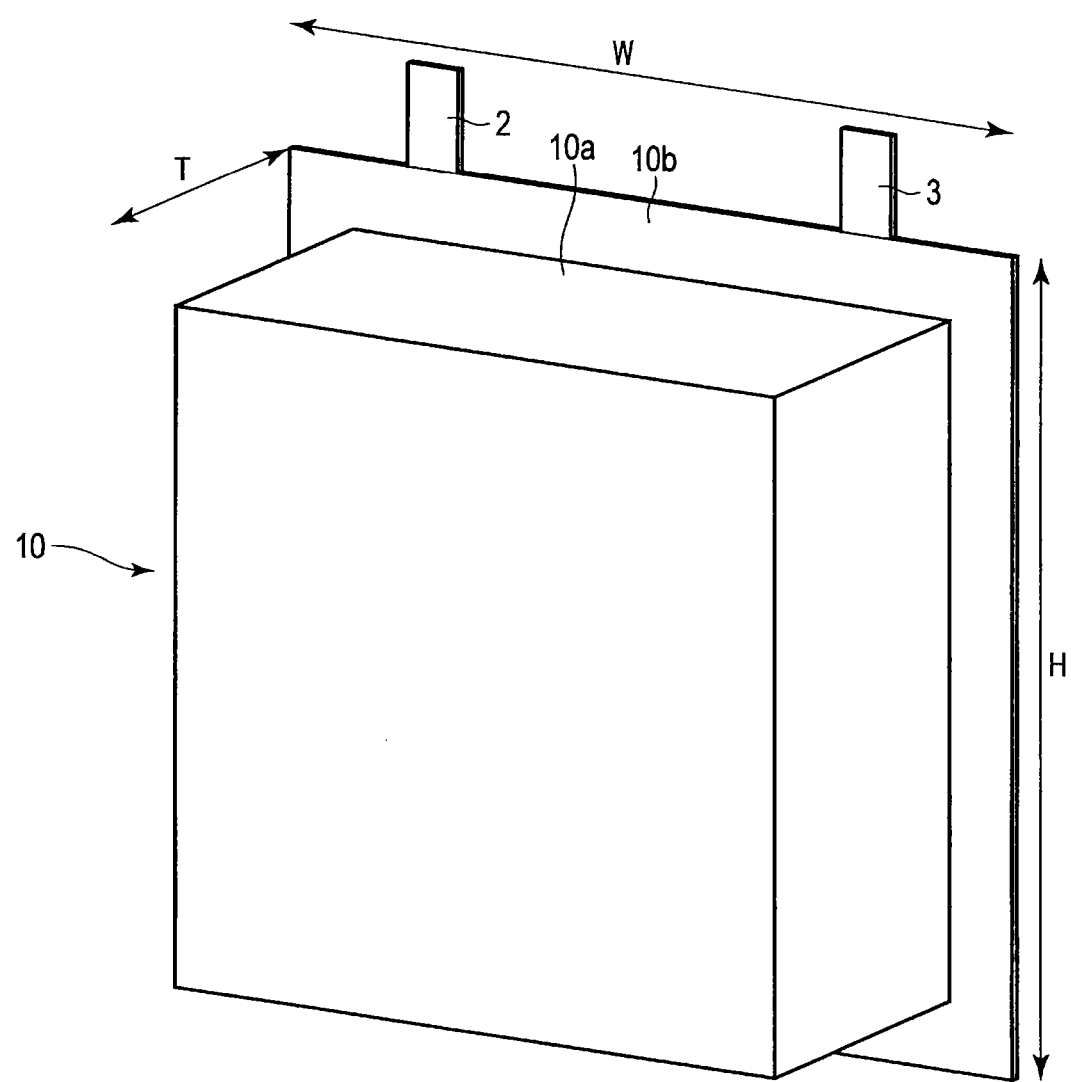
F I G. 7

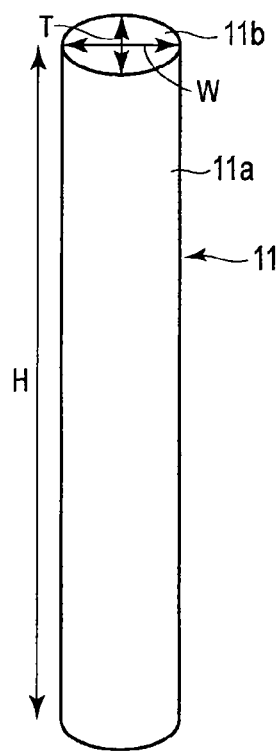
F I G. 8
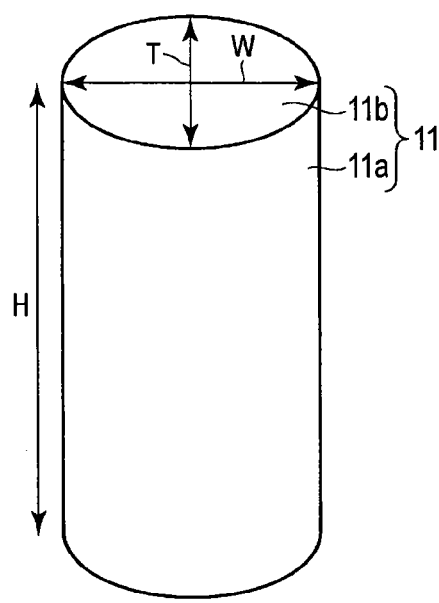
F I G. 9

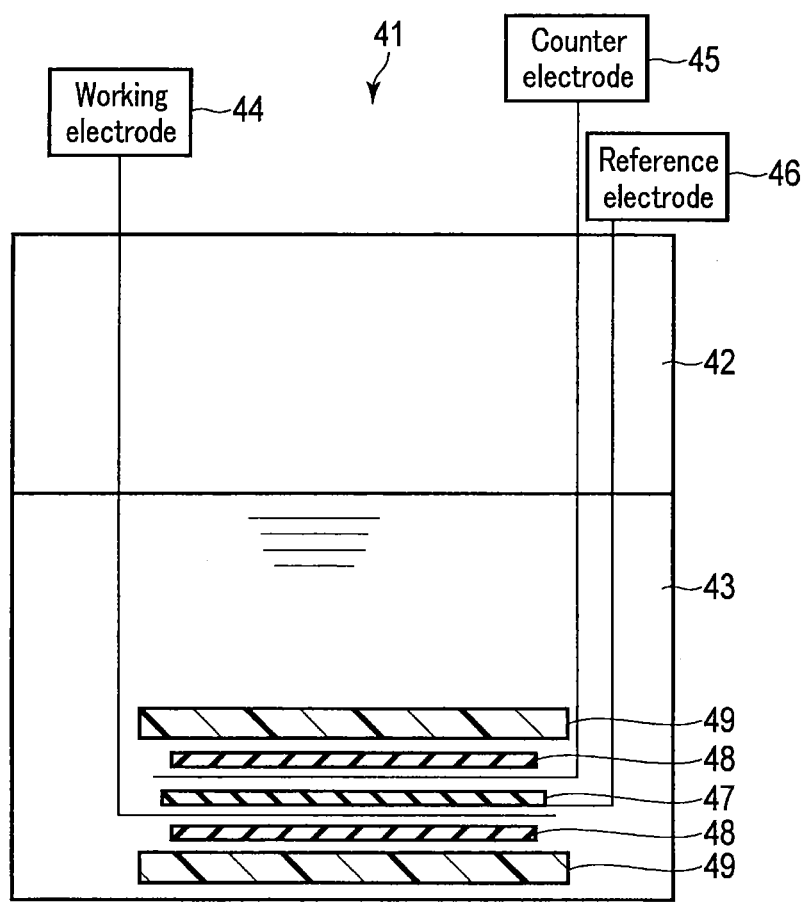
F I G. 11

NONAQUEOUS ELECTROLYTE BATTERY AND BATTERY PACK

CROSS-REFERENCE TO RELATED APPLICATIONS

This application is based upon and claims the benefit of priority from Japanese Patent Applications No. 2014-156906, filed Jul. 31, 2014, and No. 2015-042984, filed Mar. 4, 2015, the entire contents of all of which are incorporated herein by reference.

FIELD

Embodiments of the present invention relate to a nonaqueous electrolyte battery and a battery pack.

BACKGROUND

A nonaqueous electrolyte battery in which a lithium titanium oxide is used as a negative electrode active material is superior in safety to a lithium ion battery in which a carbon material is used as a negative electrode active material. On the other hand, the energy density of the nonaqueous electrolyte battery is lower than that of the lithium ion battery, which leads to a problem.

BRIEF DESCRIPTION OF DRAWINGS

FIG. 5 is a perspective view of a portion of the rectangular nonaqueous electrolyte battery according to the embodiment;

FIG. 7 is an external view of a flat nonaqueous electrolyte battery according to another embodiment;

FIG. 8 is an external view of a cylindrical nonaqueous electrolyte battery according to an embodiment;

FIG. 9 is an external view of a cylindrical nonaqueous electrolyte battery according to another embodiment;

FIG. 11 is a typical diagram showing a three-electrode cell used in each embodiment.

DETAILED DESCRIPTION

Figure 1:
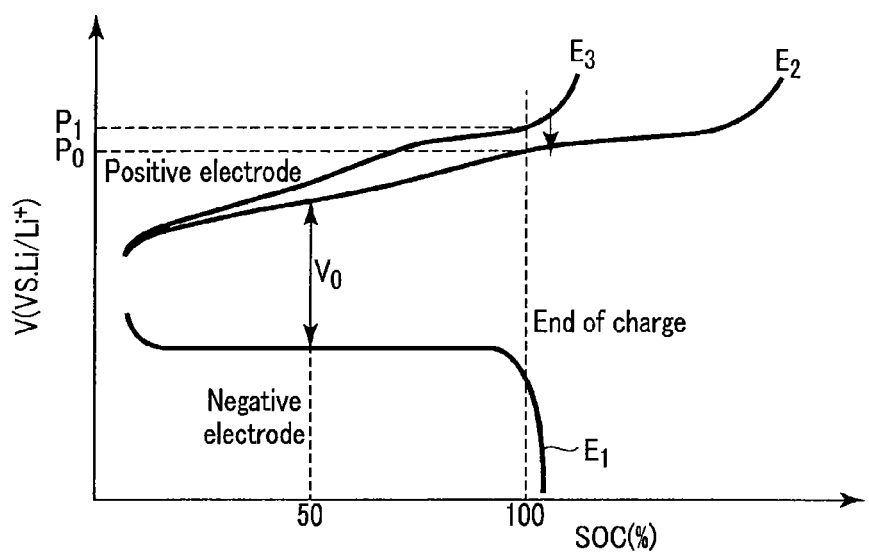
FIG. 1 is a diagram showing charge curves of positive and negative electrodes when the state of charge (SOC) of a nonaqueous electrolyte battery according to an embodiment is changed.

According to one embodiment, there is provided a nonaqueous electrolyte battery including a container, a positive electrode provided in the container, and a negative electrode provided in the container. The container satisfies Formula (1) below.

$$0.15 \leq (Tmin/Tmax) \leq 1 \tag{1}$$

wherein Tmax represents a maximum value of a height, width, and thickness of the container, meanwhile, Tmin represents a minimum value of the height, width, and thickness of the container.

The positive electrode includes a positive electrode active material represented by a composition formula $Li_{1-a}Ni_xCo_yMn_zO_2$ ($-0.1 \leq a \leq 0.4$, $0.1 \leq x/(y+z) \leq 1.3$). The negative electrode includes a spinel type lithium titanium oxide. A nominal capacity of the nonaqueous electrolyte battery is in a range of from 5 Ah to 200 Ah. When a state of charge based on the nominal capacity is 50%, an open circuit voltage is in a range of from 2.12 V to 2.24 V.

According to the embodiment, there is provided a battery pack including a nonaqueous electrolyte battery of the embodiment.

Hereinafter, the embodiments will be described with reference to the drawings. The same reference numerals denote common portions throughout the embodiments and overlapped description is not repeated. Each drawing is a typical diagram to facilitate the description of the embodiments and its understanding. The shape, size, and ratio thereof are different from those of an actual device. However, they can be appropriately designed and modified by taking into consideration the following description and known techniques

First Embodiment

According to a first embodiment, there is provided nonaqueous electrolyte battery including a container, a positive electrode provided in the container, and a negative electrode provided in the container. The container satisfies Formula (1) below.

$$0.15 \leq (Tmin/Tmax) \leq 1 \tag{1}$$

wherein Tmax represents a maximum value of the height, width, and thickness of the container, meanwhile, Tmin represents a minimum value of the height, width, and thickness of the container.

The positive electrode includes a positive electrode active material represented by the composition formula $Li_{1-a}Ni_xCo_yMn_zO_2$ ($-0.1 \leq a \leq 0.4$, $0.1 \leq x/(y+z) \leq 1.3$). The negative electrode includes a spinel type lithium titanium oxide. The nominal capacity of the nonaqueous electrolyte battery is in a range of from 5 Ah to 200 Ah. When the state of charge based on the nominal capacity is 50%, the open circuit voltage is in a range of from 2.12 V to 2.24 V.

The present inventors have found out that the nonaqueous electrolyte battery having the above configuration is excellent in safety, and a battery pack is produced using the nonaqueous electrolyte battery, whereby the volumetric efficiency can be increased.

A battery having a value (Tmin/Tmax) of less than 0.15 is excellent in heat releasing property. Accordingly, it is unlikely that the heat, which is generated by an internal short circuit due to a certain cause, causes an increase in the temperature of the battery itself. On the other hand, a battery having a value (Tmin/Tmax) of 0.15 or more is largely affected by heat generation, rather than heat release, and thus the battery temperature tends to increase. However, as the value (Tmin/Tmax) is higher, it is possible to reduce the number of cells to form a battery pack with the same capacity and voltage. Thus, it is possible to reduce sub-members other than the active material, such as lead members for multiple connections in series and parallel. Consequently, the volume energy density of the battery pack is increased. In order to increase the volume energy density of the battery pack, the value (Tmin/Tmax) is preferably in a range of from 0.2 to 0.5. Accordingly, there is a need for a battery comprising the container which satisfies Formula (1) to improve the thermal stability thereof, in order to realize a battery pack having a high volume energy density.

FIG. 1 shows charge curves $E_1$ to $E_3$ for the positive and negative electrodes in a nonaqueous electrolyte battery comprising a positive electrode containing a positive electrode active material represented by $Li_{1-a}Ni_xCo_yMn_zO_2$ and a negative electrode containing a spinel type lithium titanium oxide. A horizontal axis of the graph of FIG. 1 indicates that the case where the charge capacity in a state of charge (SOC) reaches the nominal capacity is defined as SOC 100%. A vertical axis indicates potentials (V vs. Li/Li$^+$) of the positive electrode and the negative electrode. In the nonaqueous electrolyte battery shown in FIG. 1, an open circuit voltage (OCV) $V_0$ when the nominal capacity is in a range of from 5 Ah to 200 Ah and the SOC with respect to the nominal capacity reaches 50% is a difference between the potential on the charge curve $E_2$ of the positive electrode when the SOC reaches 50% and the potential on the charge curve $E_1$ of the negative electrode when the SOC reaches 50%. When $V_0$ is in a range of from 2.12 V to 2.24 V, it is possible to keep a positive electrode potential $P_0$ when the SOC of the battery reaches 100% within a range of from 3.7 V to 4.1 V (vs. Li/Li$^+$). At this time, even if a thermal decomposition reaction of the positive electrode is caused by abnormal heat generated from the battery or heat generated from the outside, the thermal runaway of the battery itself can be prevented because the calorific power is low. Therefore, according to the battery of the embodiment, it is possible to adjust the value (Tmin/Tmax) to 0.15 or more and realize a battery pack with high safety and high volume energy density.

In order to obtain excellent safety and high volume energy density, the nominal capacity is in a range of from 5 Ah to 200 Ah, more preferably in a range of from 6 Ah to 80 Ah.

The nominal capacity of the nonaqueous electrolyte battery is determined by the following method. The nonaqueous electrolyte battery is disassembled to take out the negative electrode therefrom. The negative electrode is used as a working electrode, and Li metals are used as a counter electrode and a reference electrode to produce a three-electrode cell. FIG. 11 shows an example of the three-electrode cell.

As shown in FIG. 11, a three-electrode cell 41 includes a case 42, an electrolyte solution 43 housed in the case 42, a working electrode 44, a counter electrode 45, and a reference electrode 46. The working electrode 44, the counter electrode 45, and the reference electrode 46 are immersed in the electrolyte solution 43. A separator 47 (e.g., a cellulose separator) is disposed between the working electrode 44 and the counter electrode 45. The reference electrode 46 is inserted between the working electrode 44 and the separator 47. The counter electrode 45, the separator 47, the reference electrode 46, and the working electrode 44 are sandwiched between two glass filters 48. Polypropylene plates 49 are disposed outside of the two glass filters 48. The laminate comprising the glass filter 48, the counter electrode 45, the separator 47, the reference electrode 46, the working electrode 44, and the glass filter 48 is pressurized by the two polypropylene plates 49.

The three-electrode cell shown in FIG. 11 is charged with a constant current of 0.1 mA/cm$^2$ at 25° C. until the potential of the working electrode reaches 2.8 V (vs. Li/Li$^+$). Then, the three-electrode cell is charged at a constant potential until the charging current reaches 0.01 mA/cm$^2$. After that, the three-electrode cell is discharged with a constant current of 0.05 mA/cm$^2$ until the potential of the working electrode reaches 1.0 V (vs. Li/Li$^+$). The nominal capacity of the nonaqueous electrolyte battery is a value obtained by multiplying the quantity of electricity per unit area Q [mAh/cm$^2$] by the total area S [cm$^2$] of the negative electrode.

In the nonaqueous electrolyte battery shown in FIG. 1, even when the nominal capacity is in a range of from 5 Ah to 200 Ah, the open circuit voltage (OCV) when the SOC with respect to the nominal capacity reaches 50% is a difference between the potential on the charge curve $E_3$ of the positive electrode when the SOC reaches 50% and the potential on the charge curve $E_1$ of the negative electrode when the SOC reaches 50%, and thus it exceeds 2.24 V. As a result, a positive electrode potential $P_1$ exceeds 4.1 V (vs. Li/Li$^+$) when the SOC of the battery reaches 100%. Thus, the oxidative decomposition of the nonaqueous electrolyte in the positive electrode tends to occur, which leads to a decrease in the thermal stability of the positive electrode.

Figure 2:
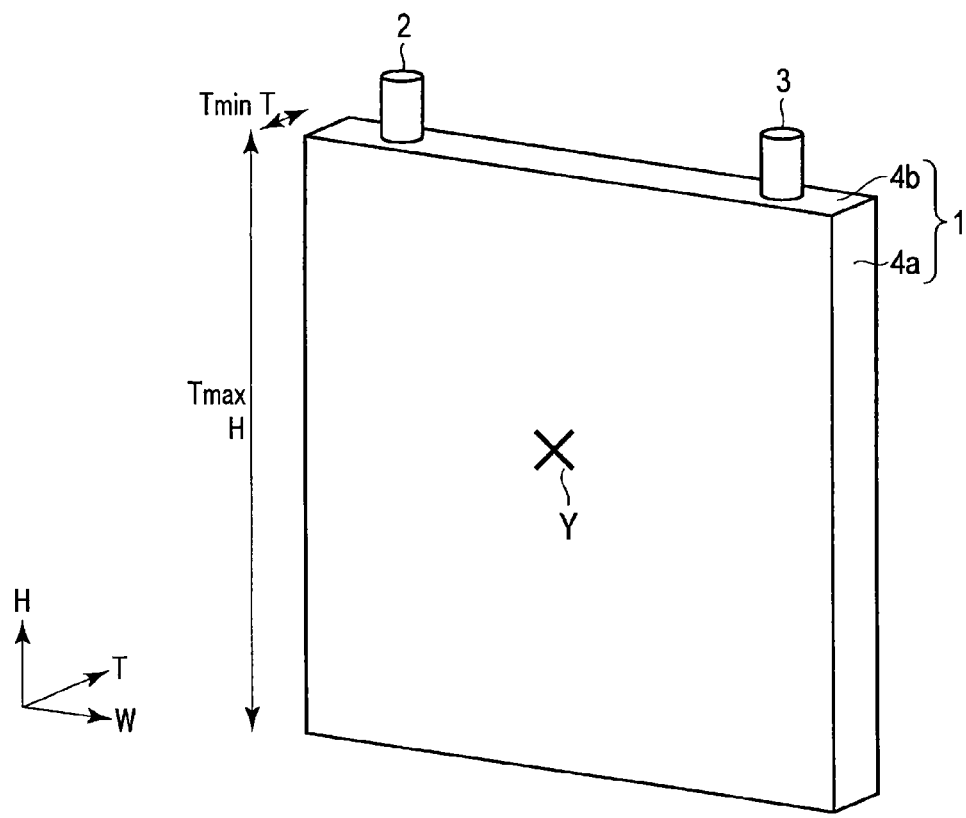
FIG. 2 is an external view of a rectangular nonaqueous electrolyte battery according to an embodiment.
Figure 3:
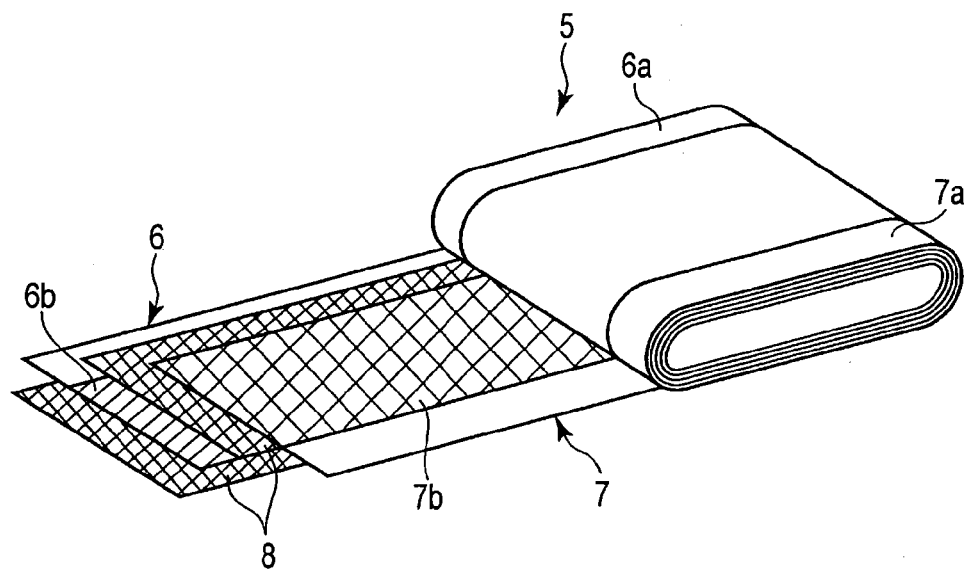
FIG. 3 is a partially expanded perspective view of an electrode group used for the nonaqueous electrolyte battery of FIG. 2.

The method of measuring the values of Tmax and Tmin will be described using FIG. 2. FIG. 2 is an external view of a rectangular nonaqueous electrolyte battery in which a metal can is used as the container. The nonaqueous electrolyte battery includes a container 1 that houses an electrical energy storing element, a positive electrode terminal 2 for taking out current, and a negative electrode terminal 3 for taking out current. The container 1 includes a rectangular cylindrical metal outer can 4a and a rectangular metal lid 4b attached to an opening of the outer can 4a. For example, a flat electrode group 5 shown in FIG. 3 is used as the electrical energy storing element. The electrode group 5 is formed by winding a positive electrode 6 and a negative electrode 7 through a separator 8 therebetween so as to have a flat shape. The positive electrode 6 includes, for example, a strip-shaped positive electrode current collector made of metal foil, a positive electrode current collecting tab 6a formed of an end portion parallel to the long side of the positive electrode current collector, and a positive electrode material layer 6b (positive electrode active material containing layer) formed in the positive electrode current collector excluding at least the positive electrode current collecting tab 6a. On the other hand, the negative electrode 7 includes, for example, a strip-shaped negative electrode current collector made of metal foil, a negative electrode current collecting tab 7a formed of an end portion parallel to the long side of the negative electrode current collector, and a negative electrode material layer 7b (negative electrode active material containing layer) formed in the negative electrode current collector excluding at least the negative electrode current collecting tab 7a. The positive electrode 6, the separator 8, and the negative electrode 7 are wound by deviating the positions of the positive electrode 6 and the negative electrode 7 so that the positive electrode current collecting tab 6a projects from the separator 8 in a winding axis direction of the electrode group, and the negative electrode current collecting tab 7a projects from the separator 8 in a direction opposite to the positive electrode current collecting tab projecting direction. Through such winding, in the electrode group 5, the spirally wound positive electrode current collecting tab 6a projects from one end face, and the spirally wound negative electrode current collecting tab 7a projects from the other end face, as shown in FIG. 3. The electrode group 5 is impregnated with an electrolyte solution (not shown). The positive electrode current collecting tab 6a is electrically connected to the positive electrode terminal 2 through a positive electrode lead (not shown). The negative electrode current collecting tab 7a is electrically connected to the negative electrode terminal 3 through a negative electrode lead (not shown).

In the rectangular nonaqueous electrolyte battery having the structure described above, when the surface from which the positive electrode terminal 2 and the negative electrode terminal 3 project is defined as the top surface, a distance between the top surface and the bottom surface (except for the height of the positive electrode terminal 2 and the height of the negative electrode terminal 3) is the height H of the container 1. The length of the short side of the top surface is the thickness T of the container 1, and the length of the long side of the top surface is the width W of the container 1. In the nonaqueous electrolyte battery of FIG. 2, the height H (not including the terminals) is the largest among the height H, width W, and thickness T of the container 1. Therefore, the height of the container is designated as Tmax, and the thickness T which is the smallest is designated as Tmin. The size of the container can be measured by using a commercially available vernier caliper (e.g., ABS DIGI-MATIC CALIPER CD-AX/APX by Mitutoyo).

The nonaqueous electrolyte battery according to the first embodiment comprises a positive electrode, a negative electrode, and a nonaqueous electrolyte, and may further comprise a separator provided between the positive electrode and the negative electrode.

The positive electrode may include a positive electrode current collector and a positive electrode material layer (positive electrode active material containing layer) which is supported by one surface or both surfaces of the positive electrode current collector.

The positive electrode material layer may include a positive electrode active material. The positive electrode material layer may further contain a conductive agent and a binder, if necessary.

The positive electrode current collector may include a portion which does not support the positive electrode material layer on the surface thereon. A portion of positive electrode current collector which does not support the positive electrode material layer functions as a positive electrode current collecting tab. Alternatively, the positive electrode may include a positive electrode current collecting tab as a separate body from the positive electrode current collector.

The negative electrode may include a negative electrode current collector and a negative electrode material layer (negative electrode active material containing layer) which is supported by one surface or both surfaces of the negative electrode current collector.

The negative electrode material layer may include a negative electrode active material. The negative electrode material layer may further contain a conductive agent and a binder, if necessary.

The negative electrode current collector may include a portion which does not support the negative electrode material layer on the surface thereon. This portion functions as a negative electrode current collecting tab. Alternatively, the negative electrode may include a negative electrode current collecting tab as a separate body from the negative electrode current collector.

The separator is disposed between the positive electrode and the negative electrode. As a result, the positive electrode material layer faces the negative electrode material layer through the separator.

The positive electrode, the negative electrode, and the separator may be configured to form an electrode group. The electrode group may have various structures. For example, the electrode group may have a stack type structure. The stack type electrode group can be obtained by laminating a plurality of positive electrodes and a plurality of negative electrodes with each of the separators sandwiched between each of the positive electrode material layers and each of the negative electrode material layers, for example. Alternatively, the electrode group may have a wound type structure. The wound type electrode group can be obtained by laminating a separator, a positive electrode, a separator, a negative electrode in this order to form a laminated body and winding the laminated body.

Such an electrode group may be impregnated with the nonaqueous electrolyte.

The nonaqueous electrolyte battery according to the first embodiment may further comprise a positive electrode terminal and a negative electrode terminal.

A part of the positive electrode terminal is electrically connected to a part of the positive electrode so that the positive electrode terminal can function as a conductor for transferring electrons from the positive electrode to an external terminal. The positive electrode terminal may be connected to, for example, the positive electrode current collector, particularly the positive electrode current collecting tab. Similarly, a part of the negative electrode terminal is electrically connected to a part of the negative electrode so that the negative electrode terminal can function as a conductor for transferring electrons from the negative electrode to an external terminal. The negative electrode terminal may be connected to, for example, the negative electrode current collector, particularly the negative electrode current collecting tab.

The nonaqueous electrolyte battery according to the first embodiment may further comprise a container. The container may house the electrode group and the nonaqueous electrolyte. The positive and negative electrode terminals or parts thereof may be extended from the container.

Hereinafter, the nonaqueous electrolyte battery according to the first embodiment will be described in detail for each member.

1) Negative Electrode

The negative electrode current collector is made of, for example, metal foil or alloy foil, particularly preferably aluminum foil or aluminum alloy foil. The aluminum foil or aluminum alloy foil preferably has an average crystal grain size of 50 μm or less, more preferably 30 μm or less, and still more preferably 5 μm or less. When the average crystal grain size of the aluminum foil or aluminum alloy foil is set to 50 μm or less, the strength of the aluminum foil or aluminum alloy foil can be remarkably enhanced. This enables the negative electrode to be pressed by high pressure, thereby increasing the density of the negative electrode material layer and enhancing the capacity of the negative electrode. In addition, dissolution and corrosion deterioration of the current collector in an over-discharge cycle in a high temperature environment (40° C. or higher) can be prevented. Further, the output performance, rapid charge, and charge-and-discharge cycle performance can be improved.

The average crystal grain size is determined as follows. The tissue of the current collector surface is observed with an optical microscope, the number (n) of crystal grains present in an area of 1 mm×1 mm is determined. The average crystal grain area S is calculated from the formula: $S=1\times10^6/n$ (μm$^2$) by using the number n. From the value of S thus obtained, the average grain size d (μm) is calculated using the following formula (A).

$$d=2(S/\pi)^{1/2} \tag{A}$$

The average crystal grain size of the aluminum foil or aluminum alloy foil varies due to the complex influence of plural factors such as the material tissue, the impurities, the processing conditions, the heat-treatment history, and the annealing conditions. The crystal grain size can be adjusted by combining these factors in the production process of the current collector.

The thickness of the current collector is preferably 20 μm or less, more preferably 15 μm or less. The purity of the aluminum foil is preferably 99% by mass or more. The aluminum alloy is preferably an alloy containing one or more element such as magnesium, zinc or silicon. The content of one or more transition metal such as iron, copper, nickel or chromium, contained as an alloy component, is preferably 1% by mass or less.

The negative electrode active material contains the spinel type lithium titanium oxide. The spinel type lithium titanium oxide preferably has the composition represented by $Li_{4+a}Ti_{5-b}M_bO_{12}$ ($0 \leq a \leq 3$, $0 \leq b \leq 1$, M includes at least one element selected from the group consisting of Al, Mg, Zn, Zr, Sn, B, Ni, Cu, and Fe). The negative electrode may contain negative electrode active materials other than the spinel type lithium titanium oxide.

Examples of other negative electrode active materials include titanium-containing metal composite oxides, amorphous tin oxides such as $SnB_{0.4}P_{0.6}O_{3.1}$, tin-silicon oxides such as $SnSiO_3$, silicon oxides such as SiO, tungsten oxides such as $WO_3$, sulfides, and nitrides. Among them, the titanium-containing metal composite oxide is preferred.

Examples of the titanium-containing metal composite oxide include lithium titanium oxides and titanium-based oxides containing no lithium when each oxide is synthesized. Examples of lithium titanium oxides other than the spinel type lithium titanium oxide include lithium titanium oxides having a ramsdellite structure. Examples of lithium titanium oxides having a ramsdellite structure include $Li_{2+y}Ti_3O_7$ (wherein y is changed by the charge and discharge reaction in the range of $-1 \leq y \leq 3$). Examples of titanium-based oxides include metal composite oxides containing $TiO_2$, Ti, and at least one element selected from the group consisting of P, V, Sn, Cu, Ni, Nb, and Fe. $TiO_2$ is preferably an anatase type and of low crystallinity upon a heat treatment temperature of from 300° C. to 500° C. Examples of the metal composite oxide containing Ti and at least one element selected from the group consisting of P, V, Sn, Cu, Ni, Nb, and Fe include $TiO_2$—$P_2O_5$, $TiO_2$-$V_2O_5$, $TiO_2$—$P_2O_5$—$SnO_2$, $TiO_2$—$P_2O_5$—MeO (wherein Me is at least one element selected from the group consisting of Cu, Ni, and Fe), and $Nb_2TiO_7$. The metal composite oxide preferably has low crystallinity, and has a microstructure wherein crystal and amorphous phases coexist, or only an amorphous phase exists. The metal composite oxide having this microstructure can greatly improve the cycle performance. Among them, the lithium titanium oxide and the metal composite oxide containing Ti and at least one element selected from the group consisting of P, V, Sn, Cu, Ni, Nb, and Fe are preferred.

Examples of the sulfide include titanium sulfide such as $TiS_2$, molybdenum sulfide such as $MoS_2$, and iron sulfide such as FeS, $FeS_2$ or $Li_xFeS_2$ ($0 \leq x \leq 2$).

Examples of the nitride include lithium cobalt nitride (e.g., $Li_xCo_yN$, wherein $0<x<4$, $0<y<0.5$).

These active materials may be used singly, or in combination of two or more kinds thereof.

Examples of the conductive agent include metal powders, acetylene black, ketjen black, and graphite.

Examples of the binder include polytetrafluoroethylene (PTFE), polyvinylidene fluoride (PVdF), fluorine-based rubber, and styrene butadiene rubber.

The negative electrode may be produced by, for example, mixing a powdery negative electrode active material with a conductive agent and a binder, suspending the mixture in an appropriate solvent, applying the suspension (slurry) to the current collector, followed by drying, and pressing to form a strip electrode.

In this case, the proportions of the negative electrode active material, the conductive agent, and the binder are preferably from 73 to 98% by weight, from 0 to 20% by weight, and from 2 to 7% by weight, respectively.

2) Positive Electrode

The positive electrode active material contains an oxide represented by the composition formula $Li_{1-a}Ni_xCo_yMn_zO_2$ ($-0.1 \leq a \leq 0.4$, $0.1 \leq x/(y+z) \leq 1.3$). Since x, y, and z are larger than 0 ($0<x$, $0<y$, $0<z$), the oxide is a nickel cobalt manganese composite containing Ni, Co, and Mn as essential components. When lithium is completely released by charge, (1−a) reaches 0. The reason why the value of x/(y+z) is in the above-described range is based on the following reasons. When the value of x/(y+z) is less than 0.1, the ratio of Ni to Co and Mn becomes smaller. This results in a decrease in the energy density of the positive electrode active material. As a result, the open circuit voltage exceeds 2.24 V when the SOC reaches 50%. On the other hand, the value of x/(y+z) exceeds 1.3, the ratio of Ni to Co and Mn becomes larger. This results in a decrease in the thermal stability of the positive electrode active material. Therefore, the value of x/(y+z) is in a range of from 0.1 to 1.3. A more preferable range is $0.6 \leq x/(y+z) \leq 1$ and $y \geq z$. In the case of $y \geq z$, the thermal stability of the positive electrode active material is improved.

The positive electrode may include positive electrode active materials other than the nickel cobalt manganese composite oxide. Examples of other positive electrode active materials include various oxides and sulfides. Examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide ($Li_xCoO_2$), lithium nickel cobalt composite oxide (e.g., $Li_xNi_{1-y-z}Co_yM_zO_2$ (wherein M is at least one element selected from the group consisting of Al, Cr, and Fe, $0 \leq y \leq 0.5$, and $0 \leq z \leq 0.1$), lithium manganese cobalt composite oxide (e.g., $Li_xMn_{1-y-z}Co_yM_zO_2$ (wherein M is at least one element selected from the group consisting of Al, Cr, and Fe, $0 \leq y \leq 0.5$, and $0 \leq z \leq 0.1$), lithium manganese nickel composite compound (e.g., $Li_xMn_{1/2}Ni_{1/2}O_2$), spinel type lithium manganese nickel composite oxide (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate (e.g., $Fe_2(SO_4)_3$), and vanadium oxide (e.g., $V_2O_5$). Other examples include organic and inorganic materials. The organic and inorganic materials include one or more conductive polymer material such as polyaniline or polypyrrole, disulfide polymer-based materials, sulfur (S), and carbon fluoride. Note that x, y, and z, whose preferred ranges are not described above, are preferably from 0 to 1.

One or more of the positive electrode active material may be used.

Examples of the conductive agent include carbon black, graphite, graphene, fullerenes, and cokes. Among them, carbon black and graphite are preferred. Examples of the carbon black include acetylene black, ketjen black, and furnace black.

Examples of the binder include polytetrafluoroethylene (PTFE), polyvinylidene fluoride (PVdF), polyacrylic acid, and fluorine-based rubber.

The positive electrode current collector is preferably formed of aluminum foil or aluminum alloy foil. The aluminum foil or aluminum alloy foil preferably has an average crystal grain size of 50 μm or less, more preferably 30 μm or less, and still more preferably 5 μm or less. When the average crystal grain size is 50 μm or less, the strength of the aluminum foil or aluminum alloy foil can be dramatically increased. Thus, the positive electrode can be densified by high pressure and the capacity of the battery can be increased.

The thickness of the current collector is 20 μm or less, more preferably 15 μm or less. The purity of the aluminum foil is preferably 99% by mass or more. Preferable examples of the aluminum alloy include alloys containing one or more element, such as magnesium, zinc, or silicon. On the other hand, the content of one or more transition metal such as iron, copper, nickel or chromium is preferably 1% by mass or less.

The positive electrode is produced by, for example, mixing a positive electrode active material with a conductive agent and a binder, suspending the mixture in an appropriate solvent, applying the suspension to a current collector such as aluminum foil, followed by drying, and pressing to form a strip electrode.

In this case, the proportions of the positive electrode active material, the conductive agent, and the binder are preferably from 80 to 95% by weight, from 3 to 20% by weight, and from 2 to 7% by weight, respectively.

3) Nonaqueous Electrolyte

The nonaqueous electrolyte may contain a nonaqueous solvent and an electrolyte salt dissolved in the nonaqueous solvent. The nonaqueous solvent may contain a polymer. In this regard, a B-containing lithium salt is preferably contained as an electrolyte salt.

Examples of the electrolyte salt include $LiPF_6$, $LiBF_4$, $Li(CF_3SO_2)_2N$ (lithium bistrifluoromethanesulfonylimide; commonly called LiTFSI), $LiCF_3SO_3$ (commonly called LiTFS), $Li(C_2F_5SO_2)_2N$ (lithium bispentafluoroethanesulfonylamide; commonly called LiBETI), $LiClO_4$, $LiAsF_6$, $LiSbF_6$, lithium bisoxalatoborate ($LiB(C_2O_4)_2$ (commonly called LiBOB)), lithium difluoro(oxalato)borate ($LiF_2BC_2O_4$), lithium difluoro(trifluoro-2-oxide-2-trifluoromethylpropionate(2-)-0,0)borate ($LiBF_2(OCOOC(CF_3)_2)$ (commonly called $LiBF_2$ (HHIB)), and lithium difluoro phosphate ($LiPO_2F_2$). These electrolyte salts may be used singly, or in mixture of two or more kinds thereof. Particularly, $LiPF_6$, $LiBF_4$, lithium bisoxalatoborate ($LiB(C_2O_4)_2$ (commonly called LiBOB)), lithium difluoro(oxalato)borate ($LiF_2BC_2O_4$), lithium difluoro(trifluoro-2-oxide-2-trifluoromethylpropionate(2-)-0,0)borate ($LiBF_2(OCOOC(CF_3)_2)$ (commonly called $LiBF_2$ (HHIB)), and lithium difluoro phosphate ($LiPO_2F_2$) are preferred.

The concentration of the electrolyte salt is preferably in a range of from 0.5 M to 3.0 M. As a result, the performance under a high load current can be improved.

The nonaqueous solvent is not particularly limited, and examples thereof include propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methylethyl carbonate (MEC), and dipropyl carbonate (DPC). These solvents may be used singly, or in mixture of two or more kinds thereof. In the case where two or more solvents are combined, all the solvents preferably have a dielectric constant of 20 or more.

The nonaqueous electrolyte may contain an additive. The additive is not particularly limited, and examples thereof include vinylene carbonate (VC), fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate, vinyl acetate (VA), vinyl butylate, vinyl hexanate, vinyl crotonate, catechol carbonate, propane sultone, and butane sultone. One or more of the additives may be used.

4) Separator

The material of the separator is not particularly limited and may contain at least one selected from the group consisting of polyolefin, cellulose, polyester, polyvinyl alcohol, polyamide, polytetrafluoroethylene, and vinylon. A porous film or non-woven fabric may be used. Each of the porous film and non-woven fabric may contain inorganic particles. The separator may be made of one material, or a combination of two or more materials.

5) Container

The container may be formed from a laminate film having a thickness of 2 mm or less, or be a metal container having a thickness of 5 mm or less. The thickness of the metal container is more preferably 0.5 mm or less. Alternatively, a resin container made of a polyolefin resin, a polyvinyl chloride resin, a polystyrene resin, an acrylic resin, a phenol resin, a polyphenylene resin or a fluorine resin may be used.

In order to improve the heat releasing property of the battery, the container is formed of a material containing at least one metal selected from the group consisting of Fe, Ni, Cu, Sn, and Al and has a thickness of from 0.2 mm to 5 mm. Alternatively, it is preferable that the container is formed of a material that includes a layer of at least one metal selected from the group consisting of Fe, Ni, Cu, Sn, and Al and a resin layer, and has a thickness of from 0.1 mm to 2 mm.

Examples of the shape of the container (i.e., the shape of the battery) include a flat type (thin type), rectangular type, cylindrical type, coin type, and button type. The battery may be a compact battery mounted on portable electronic devices, or a large battery mounted on two- or four-wheeled vehicles.

As the laminate film, a multilayer film in which a metal layer is formed between resin layers is used. The metal layer is preferably aluminum foil or aluminum alloy foil in order to reduce the weight. As the resin layer, one or more polymer material such as polypropylene (PP), polyethylene (PE), nylon or polyethylene terephthalate (PET) may be used. The laminate film can be molded into the shape of the container by sealing by thermal fusion bonding.

The metal container is made of aluminum or an aluminum alloy. The aluminum alloy is preferably an alloy containing at least one element selected from the group consisting of magnesium, zinc, and silicon. In the case where one or more transition metal such as iron, copper, nickel or chromium is contained in the alloy, the content of the transition metal is preferably 100 ppm by mass or less.

6) Negative Electrode Terminal

The negative electrode terminal may be formed of aluminum or an aluminum alloy containing at least one element selected from Mg, Ti, Zn, Mn, Fe, Cu and Si. In order to reduce the contact resistance with the negative electrode current collector, the negative electrode terminal is preferably formed of the same material as that of the negative electrode current collector.

7) Positive Electrode Terminal

The positive electrode terminal may be preferably formed of aluminum or an aluminum alloy containing at least one element selected from Mg, Ti, Zn, Ni, Cr, Mn, Fe, Cu, and Si. In order to reduce the contact resistance with the positive electrode current collector, the positive electrode terminal is preferably formed of the same material as that of the positive electrode current collector.

The battery of the first embodiment is not limited to the rectangular nonaqueous electrolyte battery having the structure shown in FIG. 2, and it may be formed into a flat shape or a cylindrical shape. The number of the electrode group housed in the container is not limited to one. A plurality of the electrode groups may be housed therein. These examples will be described with reference to FIGS. 4 to 9. Note that the same members in FIGS. 2 and 3 are identified by the same symbols, thereby omitting the repetition of explanation thereof.

Figure 4:
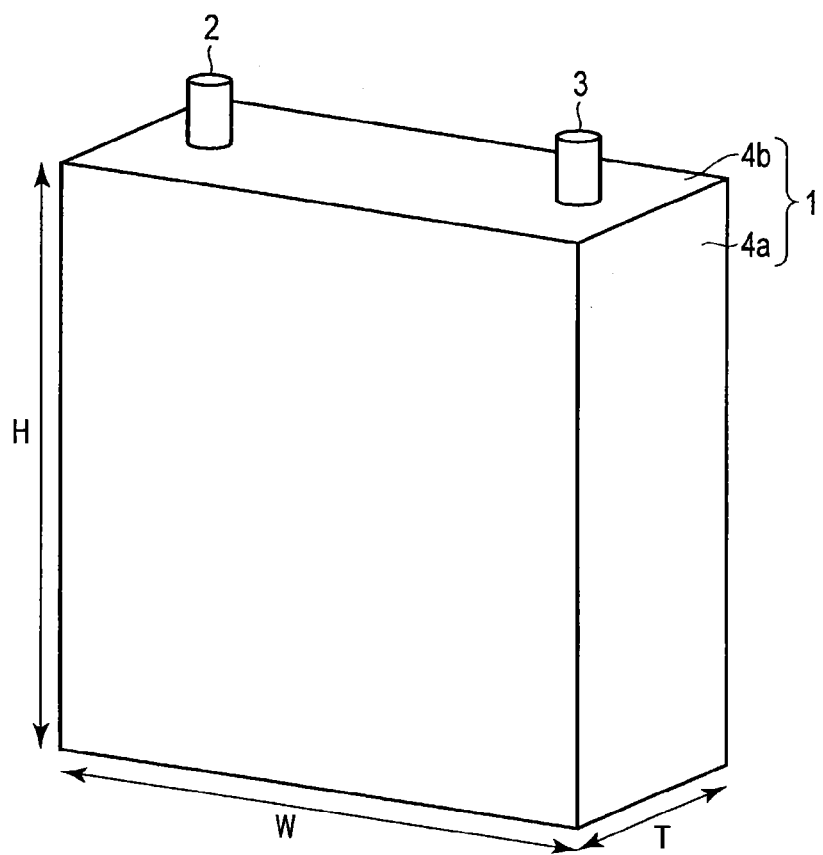
FIG. 4 is an external view of a rectangular nonaqueous electrolyte battery according to another embodiment.
Figure 6:
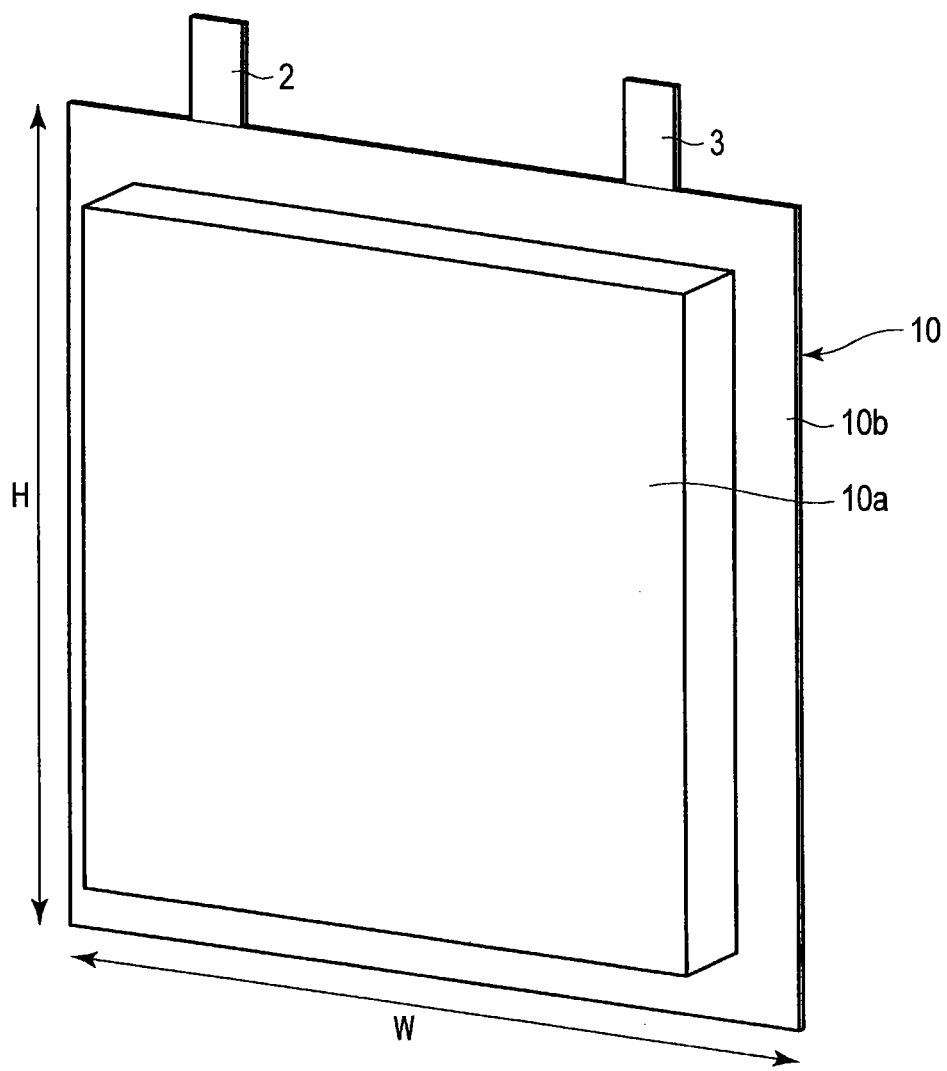
FIG. 6 is an external view of a flat nonaqueous electrolyte battery according to an embodiment.

FIG. 4 shows an example of the rectangular nonaqueous electrolyte battery in which the height H is designated as Tmax, the thickness T is designated as Tmin, and the value (Tmin/Tmax) is 0.5. FIG. 5 shows an example of the rectangular nonaqueous electrolyte battery which uses a plurality of the electrode groups 5. In the rectangular nonaqueous electrolyte battery of FIG. 5, the height H of the container 1 is larger than the width W of the container 1. The height H is designated as Tmax, and the thickness T is designated as Tmin. FIGS. 6 and 7 show examples in which a laminate film container is used in place of the metal container. A laminate film container 10 includes a housing portion having a rectangular recess 10a for housing the electrode group and a lid (not shown). An edge 10b formed on four sides around the recess 10a is bonded to the lid by heat sealing. Each of the positive electrode terminal 2 and the negative electrode terminal 3 has a stripe shape. One end of the positive electrode terminal 2 is electrically connected to the positive electrode of the electrode group 5. The other end is extended from the heat seal portion of the container 10 to the outside. One end of the negative electrode terminal 3 is electrically connected to the negative electrode of the electrode group 5. The other end is extended from the heat seal portion of the container 10 to the outside. In the flat nonaqueous electrolyte batteries of FIGS. 6 and 7, when the side of the container 1 from which the positive electrode terminal 2 and the negative electrode terminal 3 project is defined as the upper end, a distance between the upper end and the lower end (except for the length of the positive electrode terminal 2 and the length of the negative electrode terminal 3) is the height H of the container 1. The length of the side from which the positive electrode terminal 2 and the negative electrode terminal 3 project is the width W of the container 1. A distance between the lid and the recess is the thickness T of the container 1. In the flat nonaqueous electrolyte battery of FIG. 6, the height H is designated as Tmax and the thickness T is designated as Tmin. The value (Tmin/Tmax) is 0.15. In the flat nonaqueous electrolyte battery of FIG. 7, the height H is designated as Tmax and the thickness T is designated as Tmin. The value (Tmin/Tmax) is 0.5.

FIGS. 8 and 9 show examples in which a cylindrical metal container is used in place of the rectangular metal container. A cylindrical metal container 11 includes a cylindrical metal outer can 11a and a circular metal lid 11b that is attached to an opening of the outer can 11a. The outer can 11a is insulated from the lid 11b by an insulating member (not shown). The lid 11b serves as the positive electrode terminal 2, and the outer can 11a serves as the negative electrode terminal 3. In the cylindrical nonaqueous electrolyte batteries of FIGS. 8 and 9, when the lid 11b is defined as the top surface, a distance between the top surface and the bottom surface (except for the length of the positive electrode terminal 2 and the length of the negative electrode terminal 3) is the height H of the container 11. Since the top and bottom surfaces are circular, the width W and thickness T of the container 11 are equal to diameters of the top and bottom surfaces. In the cylindrical nonaqueous electrolyte battery of FIG. 8, the height H is designated as Tmax and the thickness T (the width W) is designated as Tmin. The value (Tmin/Tmax) is 0.15. In the cylindrical nonaqueous electrolyte battery of FIG. 9, the height H is designated as Tmax and the thickness T (the width W) is designated as Tmin. The value (Tmin/Tmax) is 0.5.

Since the nonaqueous electrolyte battery of the first embodiment described above comprises a container which satisfies $0.15 \leq (Tmin/Tmax) \leq 1$, a positive electrode containing a positive electrode active material represented by the composition formula $Li_{1-a}Ni_xCo_yMn_zO_2$, and a negative electrode containing a spinel type lithium titanium oxide, in which the nominal capacity is in a range of from 5 Ah to 200 Ah, and the open circuit voltage is in a range of from 2.12 V to 2.24 V when the SOC based on the nominal capacity reaches 50%, it is possible to improve the safety.

Further, a battery pack is formed by using the nonaqueous electrolyte battery, so that the volumetric efficiency can be increased Second Embodiment According to a second embodiment, there is provided a battery pack. The battery pack includes the nonaqueous electrolyte battery according to the first embodiment.

The battery pack according to the second embodiment may comprise a nonaqueous electrolyte battery or a plurality of nonaqueous electrolyte batteries. In the case where the battery pack according to the second embodiment comprises a plurality of nonaqueous electrolyte batteries, the unit cells may be electrically connected in series or in parallel and disposed therein. Alternatively, the unit cells may be connected in a combination of in series and in parallel. The battery module comprising six unit cells electrically connected in series has high voltage compatibility with a storage battery such as a lead storage battery.

The battery pack of the second embodiment will be described in detail with reference to FIG. 10. The battery pack of the second embodiment includes a battery module 22 comprising a plurality of unit cells 21 (e.g., six cells), a thermistor 25, a protective circuit 26, and an energizing terminal 27 to an external device. The battery module 22 is configured to include the unit cells 21 (e.g., six cells) which are electrically connected in series with one another. A positive electrode lead 28 is connected to the positive electrode terminal of the battery module 22, and the tip of the lead is inserted into a positive electrode connector 29 so as to be electrically connected. A negative electrode lead 30 is connected to the negative electrode terminal of the battery module 22, and the tip of the lead is inserted into a negative electrode connector 31 so as to be electrically connected. The connectors 29 and 31 are connected to the protective circuit 26 through wirings 32 and 33.

The thermistor 25 detects the temperature of the unit cells 21 and the detection signal is sent to the protective circuit 26. The protective circuit 26 can shut down a plus wiring 34a and a minus wiring 34b between the protective circuit 26 and the energizing terminal 27 to an external device under a predetermined condition. For example, the predetermined condition indicates when the detection temperature of the thermistor 25 becomes more than a predetermined temperature. Or, the predetermined condition indicates when the over-charge, over-discharge, and over-current of the unit cells 21 are detected. The over-charge detection may be performed on each of the unit cells 21 or the battery module 22. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of FIG. 10, wirings 35 for voltage detection are connected to the unit cells 21. Detection signals are sent to the protective circuit 26 through the wirings 35.

Figure 10:
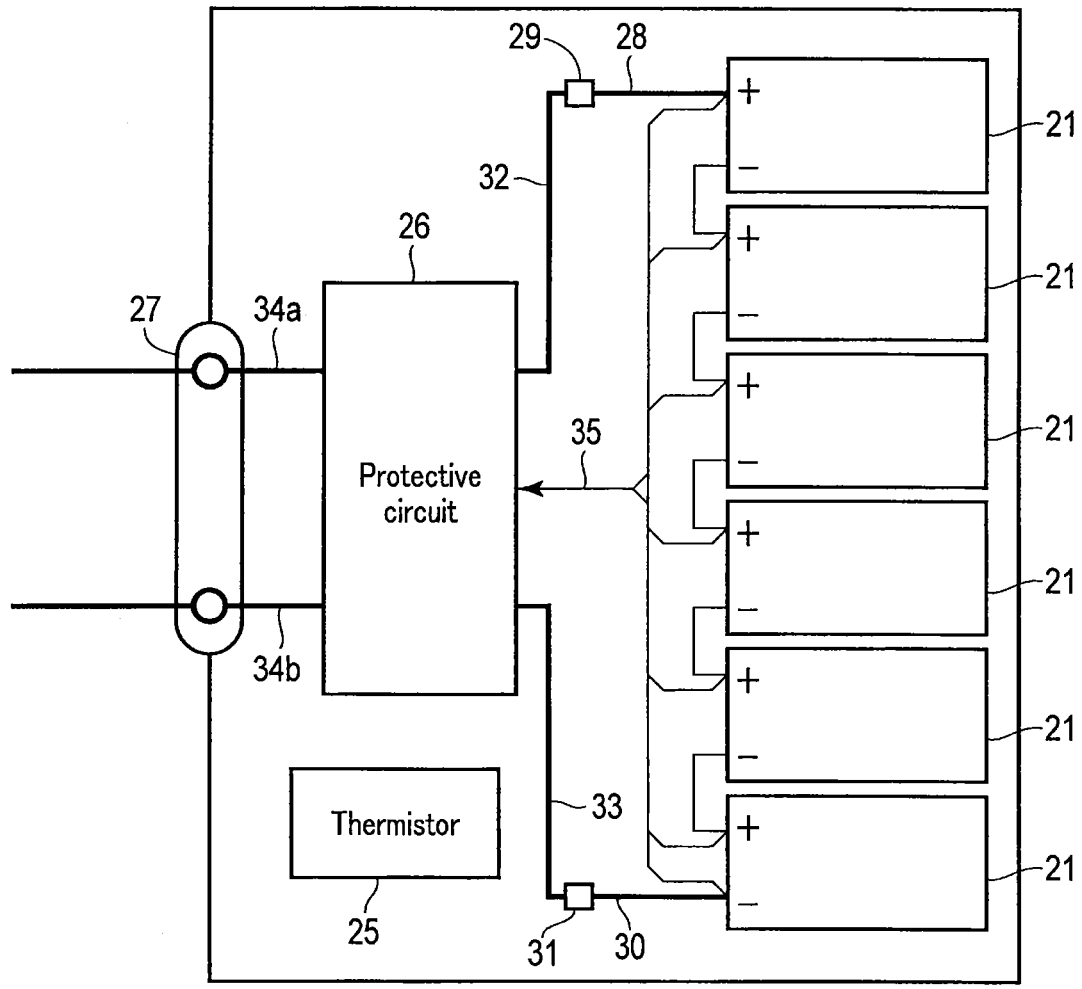
FIG. 10 is a block diagram showing an electric circuit of a battery pack according to an embodiment.

In FIG. 10, the form in which the unit cells 21 are connected in series is shown. In order to increase the battery capacity, the unit cells may be connected in parallel. The assembled battery pack may be connected in series or in parallel.

Figure 12:
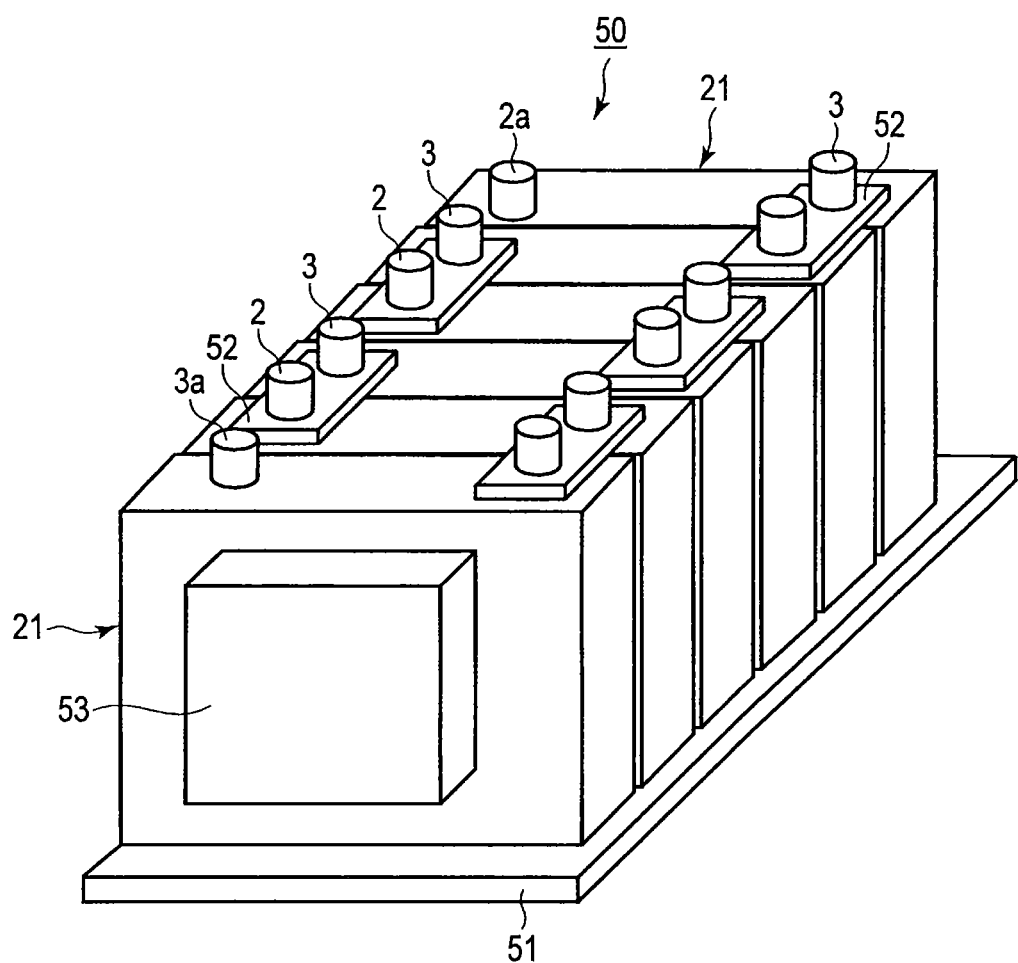
FIG. 12 is a perspective view showing a battery module according to an embodiment.

Here, an example of the battery module will be described with reference to FIG. 12. Note that the same members in FIGS. 1 to 11 are identified by the same symbols, thereby omitting the repetition of explanation thereof.

In a battery module 50, the rectangular nonaqueous electrolyte battery shown in FIG. 1 is used as the unit cell 21. Six of the unit cells 21 are fixed to a fixed plate 51 such that the positive electrode terminal 2 and the negative electrode terminal 3 project from the top surface. The positive electrode terminal 2 of one unit cell 21 and the negative electrode terminal 3 of the other unit cell 21 are electrically connected by a bus bar 52, whereby the unit cells 21 are electrically connected in series. The bus bar 52 may be formed of, for example, a conductive material such as Al, an aluminum alloy or Ni. The negative electrode terminal 3 of the unit cell 21 located in the front row (the near side of FIG. 12) functions as the negative electrode terminal 3a for external connection. In addition, the positive electrode terminal 2 of the unit cell 21 located at the end of the row (the rear side of FIG. 12) functions as the positive electrode terminal 2a for external connection. A battery management unit 53 (BMU), i.e., the protective or control circuit, is disposed so as to be adjacent to the side surface of the unit cell 21 located in the front row (the near side of FIG. 12). The positive electrode terminal 2a for external connection and the negative electrode terminal 3a for external connection are electrically connected to the BMU 53. The output from the positive electrode terminal 2a for external connection and the output from the negative electrode terminal 3a for external connection are input to an external device via the BMU 53.

The embodiment of the battery pack is appropriately changed according to the use. The applications of the battery pack are preferably those for which cycle characteristics at a large current are required. Specific examples of these applications include application as a power source of a digital camera and application to a vehicle such as a two- or four-wheeled hybrid electric vehicle, a two- or four-wheeled electric vehicle or a power-assisted bicycle. Particularly preferably, the battery pack is mounted to a vehicle.

According to the battery pack of the second embodiment described above in detail, since the nonaqueous electrolyte battery of the first embodiment is included, it is possible to provide a battery pack having high safety and high volume energy density.

EXAMPLES

Hereinafter, examples will be described. However, the present invention is not limited to the following examples unless departing from the spirit of the present invention.

Example 1

Production of Positive Electrode $LiNi_{0.5}Co_{0.3}Mn_{0.2}O_2$ was prepared as a positive electrode active material. The value of x/(y+z) in the composition of the positive electrode active material is 1, and satisfies y>z. Graphite and acetylene black were prepared as conductive agents. Polyvinylidene fluoride (PVdF) was prepared as a binder. Then, the positive electrode active material, graphite, acetylene black, and PVdF were mixed to obtain a mixture. In this case, 2.5% by weight of graphite was added based on the total weight of the positive electrode to be produced. 2.5% by weight of acetylene black was added based on the total weight of the positive electrode to be produced. 5% by weight of PVdF was added based on the total weight of the positive electrode to be produced. Then, the obtained mixture was dispersed in an n-methyl-pyrrolidone (NMP) solvent to prepare a slurry. The prepared slurry was applied to the surface of 15-μm-thick aluminum foil so that the amount of coating per unit area was 150 g/m², and then the resultant layer was dried. After that, the dried coating layer was pressed to form a positive electrode material layer on the current collector. Thus, a positive electrode having an electrode density of 3.0 g/cm³ was produced.

<Production of Negative Electrode>

A spinel type lithium-titanium composite oxide $Li_4Ti_5O_{12}$ was prepared as a negative electrode active material. Graphite was prepared as a conductive agent. PVdF was prepared as a binder. Then, the negative electrode active material, graphite, and PVdF were mixed to obtain a mixture. In this case, 5% by weight of graphite was added based on the total weight of the negative electrode to be produced. 5% by weight of PVdF was added based on the total weight of the negative electrode to be produced. Then, the obtained mixture was mixed with an N-methyl-2 pyrrolidone (NMP) solution to prepare a slurry. The prepared slurry was applied to a current collector formed of 15-μm-thick aluminum foil so that the amount of coating per unit area was 100 g/m², and then the resultant layer was dried. After that, the dried coating layer was pressed to form a negative electrode material layer on the current collector. Thus, a strip-shape negative electrode having an electrode density of 2.1 g/cm³ was produced.

The quantity of electricity per unit area Q [mAh/cm²] as for the three-electrode cell shown in FIG. 11 in which the thus produced negative electrode was used as a working electrode, and Li metals were used as a counter electrode and a reference electrode was measured. The quantity of electricity was 1.47 [mAh/cm²].

<Preparation of Nonaqueous Electrolyte>

1.0 M $LiPF_6$ was added to and dissolved in a nonaqueous solvent containing 33% by volume of propylene carbonate (PC) and 67% by volume of dimethyl carbonate (DEC) to prepare a nonaqueous electrolyte.

<Assembly of Battery>

A separator made of a cellulose non-woven fabric having a thickness of 20 μm was prepared.

The separator was impregnated with the nonaqueous electrolyte prepared in advance. Then, the positive electrode produced in advance was covered with the separator. After that, the negative electrode was laminated so as to face the positive electrode through the separator, and thus a laminated body was obtained. The laminated body was spirally wound to form a spiral electrode group. The total area S [cm$^2$] of the negative electrode of the spiral electrode group was 27210 [cm$^2$]. Therefore, the nominal capacity of the battery is 40 [Ah]. The electrode group was pressed into a flat shape.

The flat electrode group was inserted into a rectangular can-shaped container having a thickness T of 40 mm, a width W of 100 mm, and a height H of 90 mm, formed of a 1-mm-thick aluminum plate, and the container was sealed with a lid. Therefore, the width W is designated as Tmax and the thickness T is designated as Tmin. In this manner, a rectangular nonaqueous electrolyte battery having the structure shown in FIG. 2, a weight of 800 g, and a value (Tmin/Tmax) of 0.40 was produced.

<Measurement of Capacity of Battery>

The obtained battery was charged at a constant current of 1 A at 25° C. until the battery voltage reached 2.8, followed by charge at a constant voltage until the charging current reached 500 mA. Continuously, the battery was discharged at 1 A until the battery voltage reached 1.5 V. Then, the capacity of the battery was confirmed, and the obtained capacity of the battery was 40 Ah.

<Measurement of Open Circuit Voltage when State of Charge Reaches 50%>

The battery in the state of discharge after confirmation of the capacity was charged at a current of 1 A at 25° C. until the charge capacity reached 20 Ah. The charged battery was left alone at 25° C. for 2 hours. Thereafter, the voltage of the battery was measured as the open circuit voltage when the state of charge reached 50% and the value was 2.20 V.

<Evaluation of Safety>

The battery after measurement of the open circuit voltage was charged at a current of 1 A at 25° C. until the battery voltage reached 2.8 V. Thereafter, the battery was charged at a constant voltage until the charging current reached 500 mA. An 5-mm9 iron nail with a thermocouple at 25° C. disposed in the center of the nail was driven into the battery at a speed of 5 mm/sec until the nail penetrated through the center of the battery. The maximum internal nail temperature when the nail was driven into the battery was 85° C. In FIG. 2, the nail-driven portion is indicated by a symbol Y.

Example 2

A battery was produced in the same manner as Example 1 except that a rectangular can-shaped container having a thickness T of 20 mm, a width W of 100 mm, and a height H of 90 mm was used, and the area of the negative electrode was 13605 [cm$^2$]. The nominal capacity is a value obtained by multiplying the area of the negative electrode by the negative electrode capacity per unit, and thus the value is 20 Ah. The width W is designated as Tmax and the thickness T is designated as Tmin. Therefore, the value (Tmin/Tmax) was 0.2. At this time, the capacity of the battery was 20 Ah, and the open circuit voltage was 2.20 V when the state of charge reached 50%. The maximum internal nail temperature in the evaluation of safety was 80° C.

Example 3

A battery was produced in the same manner as Example 1 except that a rectangular can-shaped container having a thickness T of 80 mm, a width W of 100 mm, and a height H of 90 mm was used, and the area of the negative electrode was 54420 [cm$^2$]. The nominal capacity is a value obtained by multiplying the area of the negative electrode by the negative electrode capacity per unit, and thus the value is 80 Ah. The width W is designated as Tmax and the thickness T is designated as Tmin. Therefore, the value (Tmin/Tmax) was 0.8. At this time, the capacity of the battery was 80 Ah, and the open circuit voltage was 2.20 V when the state of charge reached 50%. The maximum internal nail temperature in the evaluation of safety was 90° C.

Comparative Example 1

A battery was produced in the same manner as Example 1 except that the amount of coating per unit area of the current collector in the positive electrode was 100 g/m$^2$, and the area of the negative electrode was 30612 [cm$^2$]. The nominal capacity is a value obtained by multiplying the area of the negative electrode by the negative electrode capacity per unit, and thus the value is 45 Ah. At this time, the capacity of the battery was 45 Ah, and the open circuit voltage was 2.30 V when the state of charge reached 50%. The maximum internal nail temperature in the evaluation of safety was 250° C.

Comparative Example 2

A battery was produced in the same manner as Example 1 except that a rectangular can-shaped container having a thickness T of 10 mm, a width W of 100 mm, and a height H of 90 mm was used, and the area of the negative electrode was 6802 [cm$^2$]. The nominal capacity is a value obtained by multiplying the area of the negative electrode by the negative electrode capacity per unit, and thus the value is 10 Ah. The width W is designated as Tmax and the thickness T is designated as Tmin. Therefore, the value (Tmin/Tmax) was 0.1. At this time, the capacity of the battery was 10 Ah, and the open circuit voltage was 2.20 V when the state of charge reached 50%. The maximum internal nail temperature in the evaluation of safety was 70° C.

Comparative Example 3

A battery was produced in the same manner as Example 1 except that a rectangular can-shaped container having a thickness T of 10 mm, a width W of 100 mm, and a height H of 90 mm was used, the amount of coating per unit area of the current collector in the positive electrode was 100 g/m$^2$, and the area of the negative electrode was 7482 [cm$^2$]. The nominal capacity is a value obtained by multiplying the area of the negative electrode by the negative electrode capacity per unit, and thus the value is 11 Ah. The width W is designated as Tmax and the thickness T is designated as Tmin. Therefore, the value (Tmin/Tmax) was 0.1. At this time, the capacity of the battery was 11 Ah, and the open circuit voltage was 2.30 V when the state of charge reached 50%.

The maximum internal nail temperature in the evaluation of safety was 80° C.

The comparison of the results of the examples to the results of the comparative examples shows that, in the batteries of Examples 1 to 3, the capacity not inferior to that of Comparative Example 1 is obtained without impairing the safety. The safety of the batteries of Comparative Examples 2 and 3 is equivalent to that of Examples 1 to 3. However, the capacity of the batteries of the comparative examples 2 and 3 is lower than that of the examples 1 to 3.

Twelve of the nonaqueous electrolyte batteries of Example 1 were prepared and electrically connected (6 in series×2 in parallel), and the volume energy density of the battery module with a voltage of 13.2 V and a capacity of 80 Ah was 205 Wh/L. Twenty four of the nonaqueous electrolyte batteries of Example 2 were prepared and electrically connected (6 in series×4 in parallel), and the volume energy density of the battery module with a voltage of 13.2 V and a capacity of 80 Ah was 190 Wh/L. Six of the nonaqueous electrolyte batteries of Example 3 were prepared and electrically connected (6 in series), and the volume energy density of the battery module with a voltage of 13.2 V and a capacity of 80 Ah was 212 Wh/L. On the other hand, forty eight of the nonaqueous electrolyte batteries of Comparative Example 2 were prepared and electrically connected (6 in series×8 in parallel), and the volume energy density of the battery module with a voltage of 13.2 V and a capacity of 80 Ah was 160 Wh/L.

The results of the battery modules of Examples 1 to 3 show that as the value (Tmin/Tmax) is larger, the volume energy density of the battery module is higher. This is due to the following fact: since the surface having the maximum area of the container (in the case of Examples 1 to 3, the surface having a height H of 90 mm and a width W of 100 mm) has a large influence on the heat releasing property of the battery, when the unit cells have the same maximum area of the container, the unit cell having a larger value of (Tmin/Tmax) has a higher nominal capacity, this allows the number of the unit cells used to produce a battery module with the same capacity and voltage to be decreased, whereby it is possible to cut down a sub-member such as a bus bar.

Table 1 shows the volume energy density of each of the battery modules formed of the nonaqueous electrolyte batteries of Examples 1 to 3 and Comparative Example 2, the number of the unit cells forming the battery modules, and the method of electrically connecting the unit cells to one another.

TABLE 1

| | Battery module | | |
|---|---|---|---|
| | Number of unit cells forming battery modules | Electrical connection | Volume energy density (Wh/L) |
| Example 1 | 12 | 6 in series × 2 in parallel | 205 |
| Example 2 | 24 | 6 in series × 4 in parallel | 190 |
| Example 3 | 6 | 6 in series | 212 |
| Comparative Example 2 | 48 | 6 in series × 8 in parallel | 160 |

Example 4

A battery was produced in the same manner as Example 1 except that a laminate film container having a thickness T of 40 mm, a width W of 100 mm, and a height H of 90 mm, which was formed of a 0.5-mm-thick aluminum containing laminate film and had a rectangular cup portion (recess) for housing the electrode group and a lid, was used. The nominal capacity is a value obtained by multiplying the area of the negative electrode by the negative electrode capacity per unit, and thus the value is 40 Ah. The width W is designated as Tmax and the thickness T is designated as Tmin. Therefore, the value (Tmin/Tmax) was 0.4. At this time, the capacity of the battery was 40 Ah, and the open circuit voltage was 2.20 V when the state of charge reached 50%. The maximum internal nail temperature in the evaluation of safety was 80° C.

Comparative Example 4

A battery was produced in the same manner as Comparative Example 1 except that a laminate film container having a thickness T of 40 mm, a width W of 100 mm, and a height H of 90 mm, which was formed of a 0.5-mm-thick aluminum containing laminate film and had a rectangular cup portion (recess) for housing the electrode group and a lid, was used. The nominal capacity is a value obtained by multiplying the area of the negative electrode by the negative electrode capacity per unit, and thus the value is 45 Ah. The width W is designated as Tmax and the thickness T is designated as Tmin. Therefore, the value (Tmin/Tmax) was 0.4. At this time, the capacity of the battery was 45 Ah, and the open circuit voltage was 2.30 V when the state of charge reached 50%. The maximum internal nail temperature in the evaluation of safety was 220° C.

Comparative Example 5

A battery was produced in the same manner as Comparative Example 2 except that a laminate film container having a thickness T of 10 mm, a width W of 100 mm, and a height H of 90 mm, which was formed of a 0.5-mm-thick aluminum containing laminate film and had a rectangular cup portion (recess) for housing the electrode group and a lid, was used. The nominal capacity is a value obtained by multiplying the area of the negative electrode by the negative electrode capacity per unit, and thus the value is 10 Ah. The width W is designated as Tmax and the thickness T is designated as Tmin. Therefore, the value (Tmin/Tmax) was 0.1. At this time, the capacity of the battery was 10 Ah, and the open circuit voltage was 2.20 V when the state of charge reached 50%. The maximum internal nail temperature in the evaluation of safety was 70° C.

Comparative Example 6

A battery was produced in the same manner as Comparative Example 3 except that a laminate film container having a thickness T of 10 mm, a width W of 100 mm, and a height H of 90 mm, which was formed of a 0.5-mm-thick aluminum containing laminate film and had a rectangular cup portion (recess) for housing the electrode group and a lid, was used. The nominal capacity is a value obtained by multiplying the area of the negative electrode by the negative electrode capacity per unit, and thus the value is 11 Ah. The width W is designated as Tmax and the thickness T is designated as Tmin. Therefore, the value (Tmin/Tmax) was 0.1. At this time, the capacity of the battery was 11 Ah, and the open circuit voltage was 2.30 V when the state of charge reached 50%. The maximum internal nail temperature in the evaluation of safety was 75° C.

Twelve of the nonaqueous electrolyte batteries of Example 4 were prepared and electrically connected (6 in series×2 in parallel), and the volume energy density of the battery module with a voltage of 13.2 V and a capacity of 80 Ah was 195 Wh/L. On the other hand, forty eight of the nonaqueous electrolyte batteries of Comparative Example 5 were prepared and electrically connected (6 in series×8 in parallel), and the volume energy density of the battery module with a voltage of 13.2 V and a capacity of 80 Ah was 150 Wh/L. The result shows that the battery module of Example 4 can provide high safety and high volume energy density.

Table 2 shows the volume energy density of each of the battery modules formed of the nonaqueous electrolyte batteries of Example 4 and Comparative Example 5, the number of the unit cells forming the battery modules, and the method of electrically connecting the unit cells to one another.

TABLE 2

| | Battery module | | |
|---|---|---|---|
| | Number of unit cells forming battery modules | Electrical connection | Volume energy density (Wh/L) |
| Example 4 | 12 | 6 in series × 2 in parallel | 195 |
| Comparative Example 5 | 48 | 6 in series × 8 in parallel | 150 |

Example 5

A battery was produced in the same manner as Example 1 except that a metal can having a bottom diameter (W, T) of 52 mm and a height H of 173 mm, which was formed of a cylindrical metal can of 0.5-mm-thick SUS, was used as the container. The nominal capacity is a value obtained by multiplying the area of the negative electrode by the negative electrode capacity per unit, and thus the value is 40 Ah. The height H is designated as Tmax and the diameter W or T is designated as Tmin. Therefore, the value (Tmin/Tmax) was 0.3. At this time, the capacity of the battery was 40 Ah, and the open circuit voltage was 2.20 V when the state of charge reached 50%. The maximum internal nail temperature in the evaluation of safety was 90° C.

Comparative Example 7

A battery was produced in the same manner as Comparative Example 1 except that a metal can having a bottom diameter (W, T) of 52 mm and a height H of 173 mm, which was formed of a cylindrical metal can of 0.5-mm-thick SUS, was used as the container. The nominal capacity is a value obtained by multiplying the area of the negative electrode by the negative electrode capacity per unit, and thus the value is 45 Ah. The height H is designated as Tmax and the diameter W or T is designated as Tmin. Therefore, the value (Tmin/Tmax) was 0.3. At this time, the capacity of the battery was 45 Ah, and the open circuit voltage was 2.30 V when the state of charge reached 50%. The maximum internal nail temperature in the evaluation of safety was 240° C.

Comparative Example 9

A battery was produced in the same manner as Comparative Example 3 except that a metal can having a bottom diameter (W, T) of 26 mm and a height H of 173 mm, which was formed of a cylindrical metal can of 0.5-mm-thick SUS, was used as the container. The nominal capacity is a value obtained by multiplying the area of the negative electrode by the negative electrode capacity per unit, and thus the value is 11 Ah. The height H is designated as Tmax. The width W or the thickness T is designated as Tmin. Therefore, the value (Tmin/Tmax) was 0.15. At this time, the capacity of the battery was 11 Ah, and the open circuit voltage was 2.30 V when the state of charge reached 50%. The maximum internal nail temperature in the evaluation of safety was 95° C.

Twelve of the nonaqueous electrolyte batteries of Example 5 were prepared and electrically connected (6 in series×2 in parallel), and the volume energy density of the battery module with a voltage of 13.2 V and a capacity of 80 Ah was 180 Wh/L. The result shows that the battery module of Example 5 can provide high safety and high volume energy density.

Example 6

A battery was produced in the same manner as Example 1 except that a rectangular can-shaped container having a thickness T of 15 mm, a width W of 100 mm, and a height H of 90 mm was used, and the area of the negative electrode was 10204 [cm²]. The width W is designated as Tmax and the thickness T is designated as Tmin. Table 3 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 7

A battery was produced in the same manner as Example 1 except that a rectangular can-shaped container having a thickness T of 100 mm, a width W of 100 mm, and a height H of 90 mm was used, and the area of the negative electrode was 68027 [cm²]. The width W or the thickness T is designated as Tmax, and the height H is designated as Tmin. Table 1 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 8

A battery was produced in the same manner as Example 1 except that the amount of coating per unit area of the current collector in the positive electrode was 250 g/m², and the area of the negative electrode was 21768 [cm²]. Table 3 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 9

A battery was produced in the same manner as Example 1 except that the amount of coating per unit area of the current collector in the positive electrode was 120 g/m², and the area of the negative electrode was 29252 [cm²]. Table 3 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Examples 10 and 11

Batteries were produced in the same manner as Example 1 except that the composition of the positive electrode active materials was changed as shown in Table 3. The value of x/(y+z) in the composition of the positive electrode active material of Example 10 was 0.1 and satisfied y>z. Further, the value of x/(y+z) in the composition of the positive electrode active material of Example 11 was 1.3 and satisfied y z.

Note that Table 3 shows the results of Examples 1 to 3 with the results of Comparative Examples 1 to 3.

of the negative electrode was 13605 [cm$^2$]. The width W is designated as Tmax, and the thickness T is designated as Tmin. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

TABLE 3

FIG. 2

|  | Tmin/Tmax | Composition of positive electrode active material | Nominal capacity (Ah) | Open circuit voltage (V) | Battery capacity (Ah) | Maximum temperature (° C.) |
| --- | --- | --- | --- | --- | --- | --- |
| Example 1 | 0.4 | LiNi$_{0.5}$Co$_{0.3}$Mn$_{0.2}$O$_2$ | 40 | 2.2 | 40 | 85 |
| Example 2 | 0.2 | LiNi$_{0.5}$Co$_{0.3}$Mn$_{0.2}$O$_2$ | 20 | 2.2 | 20 | 80 |
| Example 3 | 0.8 | LiNi$_{0.5}$Co$_{0.3}$Mn$_{0.2}$O$_2$ | 80 | 2.2 | 80 | 90 |
| Comparative Example 1 | 0.4 | LiNi$_{0.5}$Co$_{0.3}$Mn$_{0.2}$O$_2$ | 45 | 2.3 | 45 | 250 |
| Comparative Example 2 | 0.1 | LiNi$_{0.5}$Co$_{0.3}$Mn$_{0.2}$O$_2$ | 10 | 2.2 | 10 | 70 |
| Comparative Example 3 | 0.1 | LiNi$_{0.5}$Co$_{0.3}$Mn$_{0.2}$O$_2$ | 11 | 2.3 | 11 | 80 |
| Example 6 | 0.15 | LiNi$_{0.5}$Co$_{0.3}$Mn$_{0.2}$O$_2$ | 15 | 2.2 | 15 | 70 |
| Example 7 | 0.9 | LiNi$_{0.5}$Co$_{0.3}$Mn$_{0.2}$O$_2$ | 100 | 2.2 | 100 | 100 |
| Example 8 | 0.4 | LiNi$_{0.5}$Co$_{0.3}$Mn$_{0.2}$O$_2$ | 32 | 2.12 | 32 | 55 |
| Example 9 | 0.4 | LiNi$_{0.5}$Co$_{0.3}$Mn$_{0.2}$O$_2$ | 43 | 2.24 | 43 | 100 |
| Example 10 | 0.4 | LiNi$_{0.1}$Co$_{0.8}$Mn$_{0.1}$O$_2$ | 40 | 2.24 | 40 | 80 |
| Example 11 | 0.4 | LiNi$_{0.57}$Co$_{0.23}$Mn$_{0.2}$O$_2$ | 40 | 2.19 | 40 | 95 |

As is clear from Table 3, the batteries of Examples 1 to 3 have a higher capacity compared to the batteries of Comparative Examples 2 and 3, and are superior in safety to Comparative Example 1. Similarly to Examples 1 to 3, the batteries of Examples 6 to 11 have a higher capacity compared to the batteries of Comparative Examples 2 and 3, and are superior in safety to Comparative Example 1.

Example 12

A battery was produced in the same manner as Example 1 except that a laminate film container having a thickness T of 15 mm, a width W of 100 mm, and a height H of 90 mm, which was formed of a 0.5-mm-thick aluminum containing laminate film and had a rectangular cup portion (recess) for housing the electrode group and a lid, was used, and the area of the negative electrode was 10204 [cm$^2$]. The width W is designated as Tmax and the thickness T is designated as Tmin. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 13

A battery was produced in the same manner as Example 1 except that a laminate film container having a thickness T of 20 mm, a width W of 100 mm, and a height H of 90 mm, which was formed of a 0.5-mm-thick aluminum containing laminate film and had a rectangular cup portion (recess) for housing the electrode group and a lid, was used, and the area Example 14

A battery was produced in the same manner as Example 1 except that a laminate film container having a thickness T of 50 mm, a width W of 100 mm, and a height H of 90 mm, which was formed of a 0.5-mm-thick aluminum containing laminate film and had a rectangular cup portion (recess) for housing the electrode group and a lid, was used, and the area of the negative electrode was 34013 [cm$^2$]. The width W is designated as Tmax and the thickness T is designated as Tmin. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 15

A battery was produced in the same manner as Example 1 except that a laminate film container having a thickness T of 100 mm, a width W of 100 mm, and a height H of 90 mm, which was formed of a 0.5-mm-thick aluminum containing laminate film and had a rectangular cup portion (recess) for housing the electrode group and a lid, was used, and the area of the negative electrode was 68027 [cm$^2$]. The thickness T or the width W is designated as Tmax, and the height H is designated as Tmin. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 16

A battery was produced in the same manner as Example 4 except that the amount of coating per unit area of the current collector in the positive electrode was 250 g/m$^2$, and the area of the negative electrode was 21768 [cm$^2$]. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 17

A battery was produced in the same manner as Example 4 except that the amount of coating per unit area of the current collector in the positive electrode was 120 g/m$^2$, and the area of the negative electrode was 29252 [cm$^2$]. Table 4 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Note that Table 4 shows the result of Example 4 with the results of Comparative Examples 4 to 6.

TABLE 4

| | | Laminate film | | | |
|---|---|---|---|---|---|
| | Tmin/Tmax | Composition of positive electrode active material | Nominal capacity (Ah) | Open circuit voltage (V) | Battery capacity (Ah) | Maximum temperature (° C.) |
|---|---|---|---|---|---|---|
| Example 4 | 0.4 | $LiNi_{0.5}Co_{0.3}Mn_{0.2}O_2$ | 40 | 2.2 | 40 | 80 |
| Comparative Example 4 | 0.4 | $LiNi_{0.5}Co_{0.3}Mn_{0.2}O_2$ | 45 | 2.3 | 45 | 220 |
| Comparative Example 5 | 0.1 | $LiNi_{0.5}Co_{0.3}Mn_{0.2}O_2$ | 10 | 2.2 | 10 | 70 |
| Comparative Example 6 | 0.1 | $LiNi_{0.5}Co_{0.3}Mn_{0.2}O_2$ | 11 | 2.3 | 11 | 75 |
| Example 12 | 0.15 | $LiNi_{0.5}Co_{0.3}Mn_{0.2}O_2$ | 15 | 2.2 | 15 | 75 |
| Example 13 | 0.2 | $LiNi_{0.5}Co_{0.3}Mn_{0.2}O_2$ | 20 | 2.2 | 20 | 75 |
| Example 14 | 0.5 | $LiNi_{0.5}Co_{0.3}Mn_{0.2}O_2$ | 50 | 2.2 | 50 | 90 |
| Example 15 | 0.9 | $LiNi_{0.5}Co_{0.3}Mn_{0.2}O_2$ | 100 | 2.2 | 100 | 95 |
| Example 16 | 0.4 | $LiNi_{0.5}Co_{0.3}Mn_{0.2}O_2$ | 32 | 2.12 | 32 | 70 |
| Example 17 | 0.4 | $LiNi_{0.5}Co_{0.3}Mn_{0.2}O_2$ | 43 | 2.24 | 43 | 95 |

As is clear from Table 4, the battery of Examples 4 has a higher capacity compared to the batteries of Comparative Examples 5 and 6, and is superior in safety to Comparative Example 4. Similarly to Example 4, the batteries of Examples 12 to 17 have a higher capacity compared to the batteries of Comparative Examples 5 and 6, and are superior in safety to Comparative Example 4.

Example 18

A battery was produced in the same manner as Example 1 except that a metal can having a bottom diameter (W, T) of 35 mm and a height H of 172 mm, which was formed of a cylindrical metal can of 0.5-mm-thick SUS, was used as the container, and the area of the negative electrode area was 12245 [cm$^2$]. The height H is designated as Tmax and the diameter W or T is designated as Tmin. Table 5 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature.

Example 19

A battery was produced in the same manner as Example 1 except that a metal can having a bottom diameter (W, T) of 86 mm and a height H of 172 mm, which was formed of a cylindrical metal can of 0.5-mm-thick SUS, was used as the container, and the area of the negative electrode area was 74830 [cm$^2$]. The height H is designated as Tmax and the diameter W or T is designated as Tmin. Table 5 shows the nominal capacity obtained by multiplying the area of the negative electrode by the negative electrode capacity per unit, the value (Tmin/Tmax), the capacity of the battery, the open circuit voltage when the state of charge reached 50%, and the maximum internal nail temperature. Table 5 shows the result of Example 5 with the results of Comparative Examples 7 and 9.

TABLE 5

| | | Cylindrical type | | | |
|---|---|---|---|---|---|
| | Tmin/Tmax | Composition of positive electrode active material | Nominal capacity (Ah) | Open circuit voltage (V) | Battery capacity (Ah) | Maximum temperature (° C.) |
|---|---|---|---|---|---|---|
| Example 5 | 0.3 | $LiNi_{0.5}Co_{0.3}Mn_{0.2}O_2$ | 40 | 2.2 | 40 | 90 |
| Comparative Example 7 | 0.3 | $LiNi_{0.5}Co_{0.3}Mn_{0.2}O_2$ | 45 | 2.3 | 45 | 240 |
| Comparative Example 9 | 0.15 | $LiNi_{0.5}Co_{0.3}Mn_{0.2}O_2$ | 11 | 2.3 | 11 | 95 |
| Example 18 | 0.2 | $LiNi_{0.5}Co_{0.3}Mn_{0.2}O_2$ | 18 | 2.2 | 18 | 85 |
| Example 19 | 0.5 | $LiNi_{0.5}Co_{0.3}Mn_{0.2}O_2$ | 110 | 2.2 | 110 | 100 |

As is clear from Table 5, the battery of Example 5 has a higher capacity compared to the battery of Comparative Examples 9, and is superior in safety to Comparative Example 7. Similarly to Example 5, the batteries of Examples 18 to 19 have a higher capacity compared to the battery of Comparative Example 9, and are superior in safety to Comparative Example 7.

Since the nonaqueous electrolyte battery of at least one of the embodiments and the examples described above comprises a container which satisfies 0.15 (Tmin/Tmax) 1, a positive electrode containing a positive electrode active material represented by the composition formula $Li_{1-a}Ni_xCo_yMn_zO_2$, and a negative electrode containing a spinel type lithium titanium oxide, in which the open circuit voltage is in a range of from 2.12 V to 2.24 V when the SOC based on the nominal capacity reaches 50%, it is possible to improve the safety. Further, a battery pack is formed by using the nonaqueous electrolyte battery, so that the volumetric efficiency can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
    a container that satisfies Formula (1)

$$0.15 \leq (Tmin/Tmax) \leq 1 \qquad (1)$$

a positive electrode which is provided in the container and contains a positive electrode active material represented by a composition formula $Li_{1-a}Ni_xCo_yMn_zO_2$ (−0.1≤a≤0.4, 0.1≤x/(y+z)≤1.3, 0<x, 0<y, 0<z); and
    a negative electrode that is provided in the container and contains a spinel type lithium titanium oxide;
    wherein a nominal capacity is in a range of from 5 Ah to 200 Ah, an open circuit voltage is in a range of from 2.12 V to 2.24 V when a state of charge based on the nominal capacity reaches 50%,
    wherein Tmax represents a maximum value of a height, width, and thickness of the container, and Tmin represents a minimum value of the height, width and thickness of the container.

2. The nonaqueous electrolyte battery according to claim 1, wherein a value (Tmin/Tmax) is in a range of from 0.2 to 0.5.

3. The nonaqueous electrolyte battery according to claim 2, wherein x, y, and z satisfy 0.6≤x/(y+z)≤1 and y≥z.

4. The nonaqueous electrolyte battery according to claim 2, wherein the container is formed of a material containing at least one metal selected from the group consisting of Fe, Ni, Cu, Sn, and Al, and has a thickness of from 0.2 mm to 5 mm.

5. The nonaqueous electrolyte battery according to claim 2, wherein the container is formed of a material that includes a layer of at least one kind of metal selected from the group consisting of Fe, Ni, Cu, Sn, and Al and a resin layer, and has a thickness of from 0.1 mm to 2 mm.

6. The nonaqueous electrolyte battery according to claim 2 further comprising
    electrode groups that are provided in the container and include the positive electrode and the negative electrode.

7. A battery pack comprising a battery module comprising six nonaqueous electrolyte batteries electrically connected in series, wherein each of the six nonaqueous electrolyte batteries is the nonaqueous electrolyte battery according to claim 1.

8. A battery pack, comprising battery modules which are electrically connected in series or in parallel and comprise six nonaqueous electrolyte batteries electrically connected in series, wherein each of the six nonaqueous electrolyte batteries is the nonaqueous electrolyte battery according to claim 1.

* * * * *